(12) United States Patent
Frazier (10) Patent No.: US 7,038,623 B2
(45) Date of Patent: May 2, 2006

(54) METHOD AND APPARATUS FOR DETECTING RADIATION AT ONE WAVELENGTH USING A DETECTOR FOR A DIFFERENT WAVELENGTH

(75) Inventor: Gary A. Frazier, Garland, TX (US)

(73) Assignee: Raytheon Company, Waltham, MA (US)

( * ) Notice: Subject to any disclaimer, the term of this patent is extended or adjusted under 35 U.S.C. 154(b) by 143 days.

(21) Appl. No.: 10/729,143

(22) Filed: Dec. 4, 2003

(65) Prior Publication Data

US 2005/0122269 A1    Jun. 9, 2005

(51) Int. Cl.
    *H01Q 1/38*    (2006.01)
(52) U.S. Cl. .............. 343/700 MS; 343/703; 343/795
(58) Field of Classification Search ......... 343/700 MS, 343/703, 793, 795, 879
    See application file for complete search history.

(56) References Cited

U.S. PATENT DOCUMENTS

| | | | |
|---|---|---|---|
| 4,654,622 A | 3/1987 | Foss et al. ................. 338/14 |
| 5,171,733 A * | 12/1992 | Hu .......................... 505/161 |
| 6,292,140 B1 | 9/2001 | Osterman ................. 343/718 |
| 6,348,887 B1 | 2/2002 | Broekaert | |
| 6,509,859 B1 | 1/2003 | van der Wagt | |
| 6,515,285 B1 * | 2/2003 | Marshall et al. ........... 250/352 |

FOREIGN PATENT DOCUMENTS

| EP | 0 903 566 A2 | 3/1999 |
|---|---|---|
| WO | WO 90/01685 | 2/1990 |

OTHER PUBLICATIONS

PCT, Notification of Transmittal of the International Search Report and the Written Opinion of the International Searching Authority, or the Declaration, PCT/US2004/039703, 13 pages, Mar. 4, 2005.

Richard H. Mathews, et al., "A New RTD-FET Logic Family", Proceedings of the IEEE, vol. 87, No. 4, Apr. 1999, pp. 596-605.

* cited by examiner

*Primary Examiner*—Shih-Chao Chen
(74) *Attorney, Agent, or Firm*—Baker Botts L.L.P.

(57) ABSTRACT

An apparatus includes a resonator portion responsive to electromagnetic radiation within a frequency range, a converter portion responsive to radiation received by the resonator portion for emitting electromagnetic radiation within a different frequency range, and a detector portion which detects the radiation emitted by the converter portion. According to one feature, the resonator portion, the converter portion and the detector portion are respective parts of an integrated circuit. According to a different feature, the radiation emitted by the converter portion is infrared energy.

29 Claims, 7 Drawing Sheets

METHOD AND APPARATUS FOR DETECTING RADIATION AT ONE WAVELENGTH USING A DETECTOR FOR A DIFFERENT WAVELENGTH

TECHNICAL FIELD OF THE INVENTION

This invention relates in general to techniques for detecting radiation and, more particularly, to techniques for detecting radiation in one frequency range using a detector which operates in a different frequency range.

BACKGROUND OF THE INVENTION

There are existing devices that can accurately and efficiently detect and/or image infrared (IR) radiation. These devices are utilized in a variety of applications, including military and commercial applications. However, it is possible for environmental and other factors to interfere with efficient and accurate detection of a target or scene using IR energy. For example, the presence of clouds, smoke, rain, or even camouflage netting can make it difficult for an IR detector to accurately and reliably detect the IR radiation emitted from or scattered by a target or scene which is of interest. On the hand, a target or scene of interest will usually emit or scatter not only IR radiation, but also radiation at significantly lower frequencies. Radiation at these lower frequencies can readily penetrate clouds, smoke, rain, camouflage netting and other comparable conditions or structures, and is thus less susceptible to adverse influence from various environmental conditions. However, detecting and/or imaging this lower frequency radiation can present some problems.

In this regard, existing IR detectors (which are often called bolometers) are highly sensitive devices that are capable of measuring a temperature change caused by the absorption by the detector of received radiation. Although these devices are optimized for IR radiation, radiant energy in other frequency ranges can theoretically be absorbed and produce a measurable temperature change within an IR detector. This is advantageous from the perspective that, as noted above, radiation with a frequency well below the frequency of IR radiation is less susceptible to certain environmental influences.

Consideration has therefore been given to the idea of using an IR detector to detect such radiation. However, in the case of radiation with a frequency well below that of IR radiation, the wavelength of the radiation is much longer than the size of a typical bolometer. Consequently, in order to efficiently capture the energy of this radiation, it is necessary to provide a resonant antenna-like structure for the low frequency radiation. In this regard, in order to efficiently detect lower frequency radiation through use of an antenna, the electromagnetic energy received by the antenna must be efficiently coupled into the IR detector, so that the IR detector undergoes a measurable temperature change.

But optimized bolometers usually have a thermally sensitive material (such as amorphous silicon) with an electrical resistance which is several thousand ohms per square. This resistance would also correspond to the electromagnetic load resistance presented by the bolometer to the antenna. In contrast, resonant antenna configurations suitable for the low frequency radiation of interest will typically have a relatively low impedance, on the order of a few ohms to a few hundred ohms. Therefore, the concept of using a resonant antenna-like structure with a bolometer has been hampered by the fact that the need to maximize the sensitivity of the high-resistance bolometer tends to conflict with the need to match the bolometer impedance to the low-impedance antenna resonator.

SUMMARY OF THE INVENTION

From the foregoing, it may be appreciated that a need has arisen for a method and apparatus for capturing radiation in one frequency range and then detecting this energy with a detector that operates in a different frequency range. According to one form of the invention, a method and apparatus are provided to address this need in the context of an arrangement which includes an integrated circuit having a section with a resonator portion, a converter portion coupled to the resonator portion, and a detector portion disposed in the region of the converter portion. In this context, the method and apparatus involve: causing the converter portion to respond to radiation received by the resonator portion within a first frequency range by emitting electromagnetic radiation within a second frequency range substantially different from the first frequency range; and detecting with the detector portion the radiation emitted by the converter portion within the second frequency range.

A different form of the invention relates to the context of an arrangement which includes a resonator portion, a converter portion coupled to the resonator portion, and a detector portion disposed in the region of the converter portion. In this context, the method and apparatus involve: causing the converter portion to respond to radiation received by the resonator portion within a selected frequency range by emitting infrared radiation, the selected frequency range being substantially different from a frequency range of infrared radiation; and detecting with the detector portion the infrared radiation emitted by the converter portion.

BRIEF DESCRIPTION OF THE DRAWINGS

A better understanding of the present invention will be realized from the detailed description which follows, taken in conjunction with the accompanying drawings, in which.

DETAILED DESCRIPTION

Figure 1:
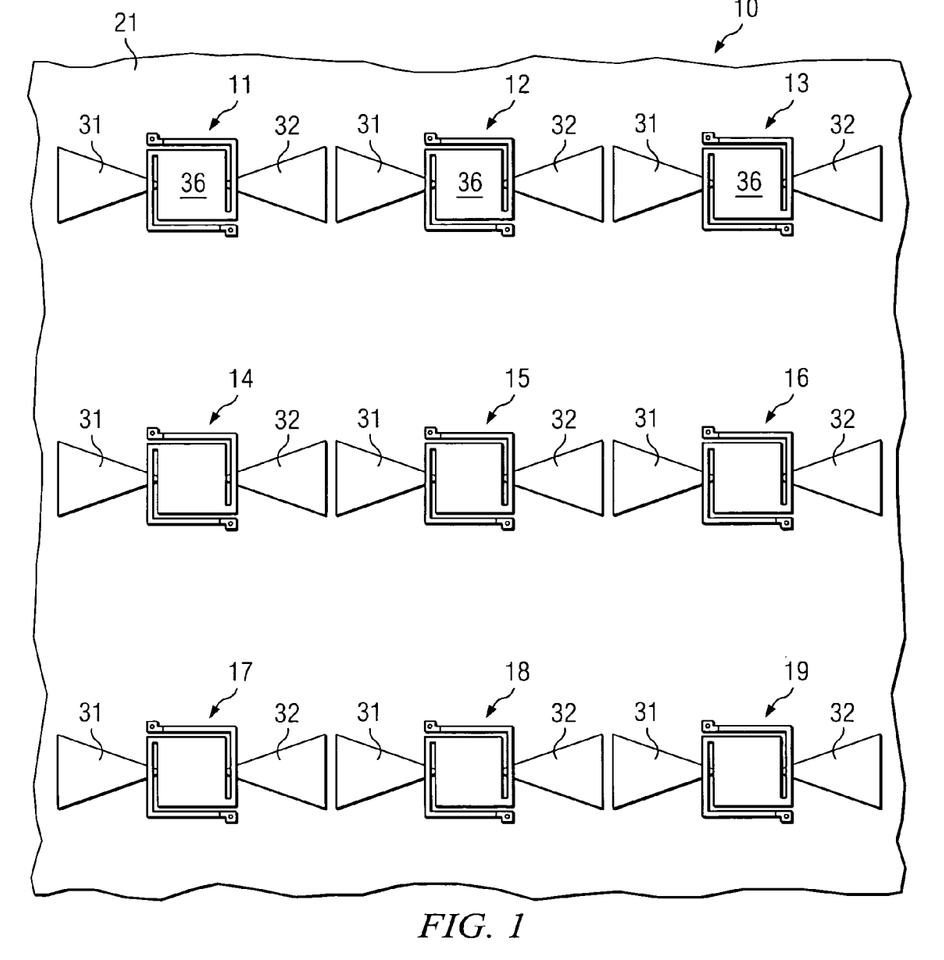
FIG. 1 is a diagrammatic fragmentary top view of part of an integrated circuit which includes an array of detector sections.

FIG. 1 is a diagrammatic fragmentary top view of an apparatus which is part of an integrated circuit 10. The integrated circuit 10 includes a two-dimensional array of detector sections, nine of which are visible at 11–19 in FIG. 1. The nine detector sections 11–19 are provided on a substrate 21, and represent a portion of a larger array of detector sections. Each of the detector sections 11–19 generates a respective pixel in images produced by the array.

In the embodiment of FIG. 1, the detector sections 11–19 are each configured to detect electromagnetic radiation which impinges on the integrated circuit 10 from externally thereof, and which is within a frequency range that is well below the frequency range of infrared (IR) radiation. Stated differently, each of the detector sections 11–19 is configured to detect radiation having wavelengths which are substantially longer than the wavelengths of infrared radiation. For example, infrared radiation typically has wavelengths within a range of approximately 2 to 15 microns, whereas the detector sections 11–19 are each configured to detect radiation with significantly longer wavelengths, such as radiation with wavelengths ranging from roughly 100 microns to roughly 2,000 microns. The detector sections 11–19 could, for example, each be configured to be optimally responsive to radiation having a wavelength of about 1,000 microns. However, although some specific wavelength values are given here by way of example, the present invention can be used with incident radiation having other frequencies and wavelengths.

Figure 2:
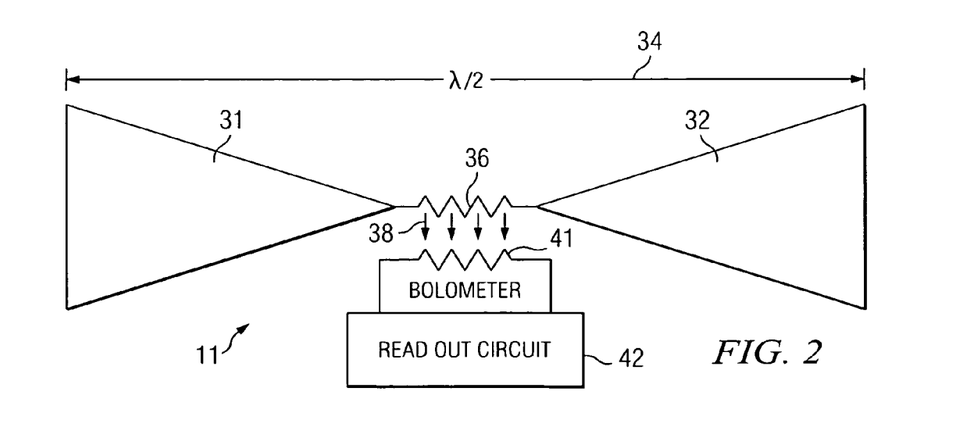
FIG. 2 is a block diagram of one of the detector sections of the apparatus of FIG. 1.

In the embodiment of FIG. 1, the detector sections 11–19 are all effectively identical. Therefore, only one of these detector sections will be described here in greater detail, which is the detector section 11. More specifically, FIG. 2 is a block diagram of the detector section 11. The detector section 11 includes two spaced and electrically conductive antenna elements 31 and 32, which are each approximately triangular, and which are arranged to form a dipole antenna configuration of a type commonly known as a bow-tie antenna. Although the antenna elements 31–32 of FIG. 2 define a resonator which is a bow-tie antenna, it would alternatively be possible to utilize any other suitable resonator configuration.

The distance 34 between the outer edges of the antenna elements 31 and 32 is selected to be approximately one-half of the wavelength $\lambda$ for the center frequency of the frequency range that the detector section 11 is intended to detect. This permits the bow-tie antenna 31–32 to serve as a resonator with respect to frequencies near that center frequency, in order to optimize reception of those frequencies. With reference to FIG. 1, it will be noted that the center-to-center spacing of the detector sections 11 in both horizontal and vertical directions is a dimension which is slightly greater than the dimension 34 in FIG. 2.

The detector section 11 includes a resistor 36, which has each end coupled to an apex of a respective one of the antenna elements 31 and 32. The resistance of the resistor 36 is selected to be a very close match to the low impedance of the resonator defined by the antenna elements 31–32. The electrical connection between each antenna element 31–32 and the associated end of the resistor 36 is configured to be relatively small, in order to provide a degree of thermal isolation between the resistor 36 and the antenna elements 31–32, so as to minimize the extent to which heat generated within the resistor can flow into either antenna element.

The resistor 36 will inherently emit some level of infrared radiation, even when it is not receiving energy from the antenna elements 31–32. But as the antenna elements 31–32 absorb radiation which is within the frequency range of interest, the energy from this received radiation will be absorbed by the resistor 36, and the resulting electromagnetic current in the resistor will cause the resistor 36 to undergo Joule heating and to emit additional infrared radiation, as shown diagrammatically by several arrows 38. It will be noted that, in effect, the resistor 36 takes received radiation which is within a first frequency range, and converts it into radiation within a second and significantly different frequency range, which in this embodiment is infrared radiation.

In FIG. 2, the infrared radiation emitted at 38 by the resistor 36 is detected by an infrared detector 41 of a known type, which is commonly called a bolometer. The bolometer 41 is coupled to a circuit 42 of a known type, which is commonly referred to as a readout circuit. In the integrated circuit 10 of FIG. 1, a respective separate readout circuit 42 is disposed within the substrate 21 below each of the detector sections 11–19, but for clarity these readout circuits are not visible in FIG. 1.

Although as discussed above the detector sections 11–19 are all identical in the embodiment of FIGS. 1–2, the invention is not limited to this configuration. For example, the detector sections 11–19 in FIG. 1 all have the same orientation, but it would alternatively be possible for their orientations to be different. For example, all of the detector sections in every other column could be rotated 90° clockwise from their illustrated positions. As another example, the orientations of the various detector sections could be random. It would also be possible for the detector sections to differ in structure. As one example, different detector sections could have different lengths $\lambda/2$ (FIG. 2), so that different detector sections in a given array are responsive to radiation in respective different frequency ranges. This would permit the array to span a larger range of frequencies than would be practical for a single detector section.

Figure 3:
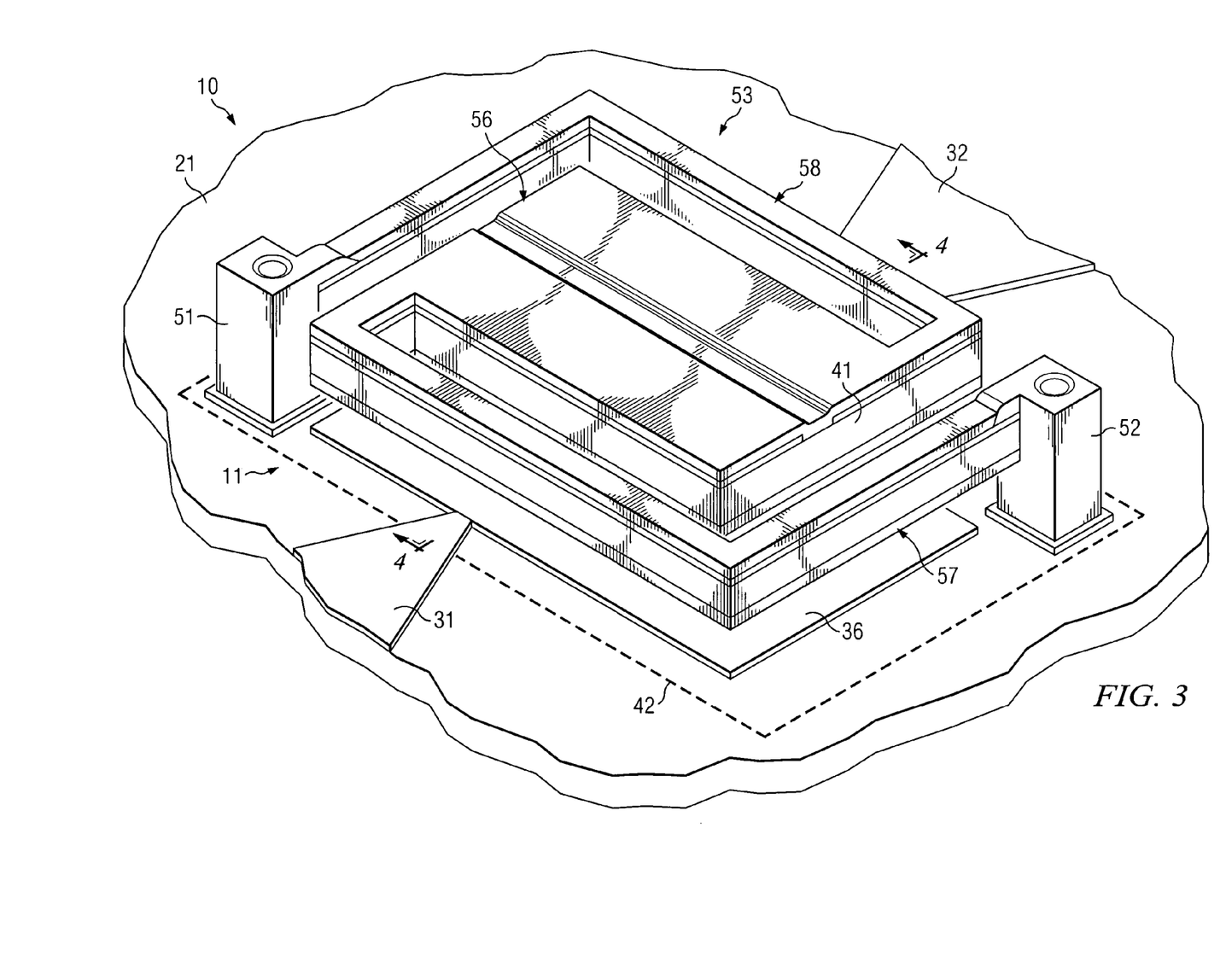
FIG. 3 is a diagrammatic fragmentary perspective view of one of the detector sections of FIG. 1, in an enlarged scale.
Figure 4:
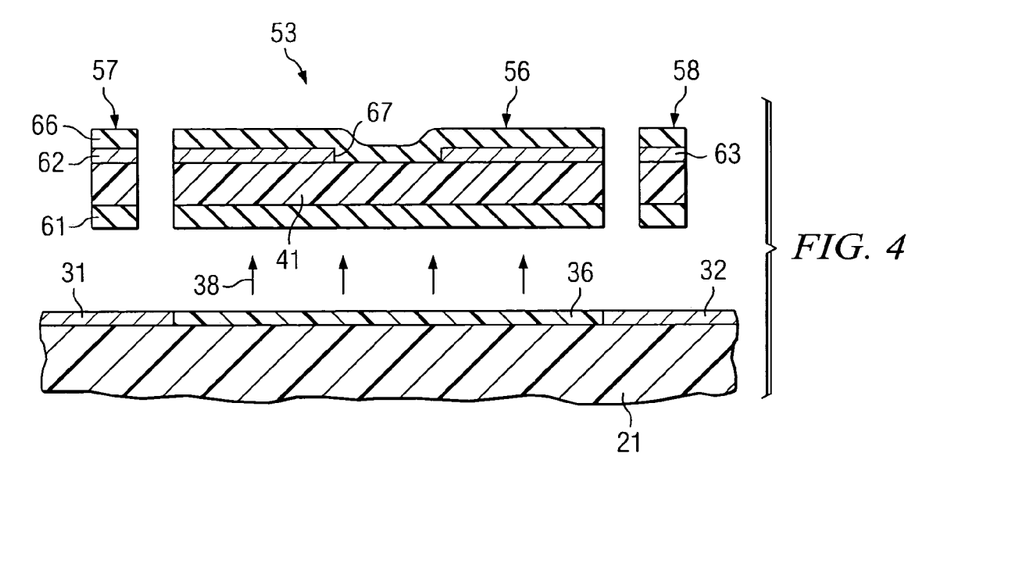
FIG. 4 is a diagrammatic sectional view taken along the section line 4—4 in FIG. 3.

FIG. 3 is a diagrammatic fragmentary perspective view which shows the detector section 11 of FIG. 1 in an enlarged scale. FIG. 4 is a diagrammatic fragmentary sectional view taken along the section line 4—4 in FIG. 3. It will be noted from FIGS. 3–4 that the bolometer 41 is suspended at a location spaced vertically above the substrate 21. In this regard, FIG. 3 shows two electrically conductive posts 51 and 52, which each extend vertically upwardly from the substrate 21. As mentioned earlier, a readout circuit 42 is implemented within the substrate 21, adjacent the top surface. For clarity, the readout circuit 42 is indicated diagrammatically in FIG. 3 by a broken line. Each post 51 and 52 has its lower end coupled electrically to the readout circuit 42. The upper ends of the posts 51 and 52 support a membrane 53 at a location spaced vertically above the substrate 21. The space between the membrane 53 and the substrate 21 is approximately one-quarter of the wavelength of infrared radiation, for a reason which is explained later.

The membrane 53 includes a center portion 56, as well as two L-shaped legs 57 and 58 that extend from diagonally opposite corners of the center portion 56 to the tops of the respective posts 51 and 52. The membrane 53 is a multilayer component. It has a bottom layer 61 which is made of a material such as silicon nitride, a bolometer layer 41 which is disposed on the bottom layer 61 and made of a thermally sensitive material such as amorphous silicon, two spaced electrodes 62 and 63 which are disposed on the bolometer layer 41, and a top layer 66 which is made of a material such as silicon nitride.

The electrodes 62 and 63 are separated by a gap or slot 67 which extends across the middle of the center portion 56. Each of the electrodes 62 and 63 has a portion which extends along a respective one of the legs 57 and 58, and which is electrically coupled to the upper end of a respective one of the conductive posts 51 and 52. The amorphous silicon in the bolometer layer 41 has a resistance which inherently varies in response to changes in temperature. The readout circuit 42 is coupled to the bolometer layer 41 through the conductive posts 51–52 and the electrodes 62–63. The readout circuit 42 can electrically determine the resistance of the bolometer 41 between the electrodes 62–63 at any given point in time, which in turn allows the readout circuit 42 to determine the current temperature of the bolometer layer 41. This in turn is a representation of the amount of heat that the bolometer layer 41 has absorbed, and the amount of absorbed heat corresponds to the amount of energy in the received radiation.

With reference to FIG. 3, the resistor 36 of FIG. 2 is implemented in the form of a thin rectangular film which is disposed on the top surface of the substrate 21. In the disclosed embodiment, the resistor 36 is made from titanium tungsten (TiW), but could alternatively be made from any other suitable material, including but not limited to nickel chromium (NiCr), tungsten, doped polysilicon, or various primary metals. As shown in FIG. 3, the antenna elements 31 and 32 are disposed on opposite sides of the resistor 36, and are thin layers disposed on the top surface of the substrate 21. The antenna element 31 has an apex which is electrically coupled to an edge on one side of the resistor 36, and the antenna element 32 has an apex which is electrically coupled to an edge on the opposite side of the resistor 36. In the disclosed embodiment, the antenna elements 31 and 32 are each made of a metal such as aluminum, gold, or copper, but could alternatively be made of any other suitable material.

With reference to FIG. 4, and as discussed earlier in association with FIG. 2, the antenna elements 31 and 32 collectively serve as a resonator which receives radiation within a selected frequency range that is substantially different from the frequency of infrared radiation. In particular, this received radiation has a frequency much lower than the frequency of infrared radiation. The energy from this received radiation is absorbed by the resistor 36, and causes the resistor 36 to be heated and to emit infrared radiation at 38. This infrared radiation travels upwardly and is absorbed within the membrane 53, where it heats the bolometer layer 41 and thus changes its resistance. The readout circuit 42 can measure how this resistance changes over time, and can thus measure the amount of heat absorbed by the membrane 53, which in turn represents the amount of the radiation of interest which has been received by the antenna elements 31 and 32.

As mentioned above, the vertical spacing between the resistor 36 and the membrane 53 is approximately one-quarter of the wavelength of infrared radiation. This space effectively serves as a resonant cavity for infrared radiation, such that the thermal energy 38 produced by the resistor 36 is essentially trapped within this cavity until it can be absorbed by the bolometer 41, thereby ensuring that the bolometer 41 has a high efficiency with respect to absorption of the infrared energy 38 produced by the resistor 36. In the disclosed embodiment, this cavity is subject to a vacuum, but it would alternatively be possible to provide a gas within this cavity, such as nitrogen, freon, argon, helium, carbon dioxide, or any other suitable gas. As mentioned above, the resistor 36 in the depicted embodiment is made of titanium tungsten. This means that it has not only a suitable resistance characteristic, but that it also is reflective to infrared radiation. This reflectance helps to keep infrared radiation trapped within the resonant cavity until the radiation can be absorbed by the membrane 53.

As mentioned above, the resistor 36 is configured to have a resistance which is matched to the impedance of the antenna elements 31 and 32. Depending on the frequency of the incident radiation which is to be detected, the configuration and thus the impedance of the antenna elements 31 and 32 can be different. Consequently, although the rectangular resistor 36 of FIG. 3 is suitable for some frequency ranges, and can be adjusted to some extent by varying its size, thickness and material, other approaches are also possible.

Figure 5:
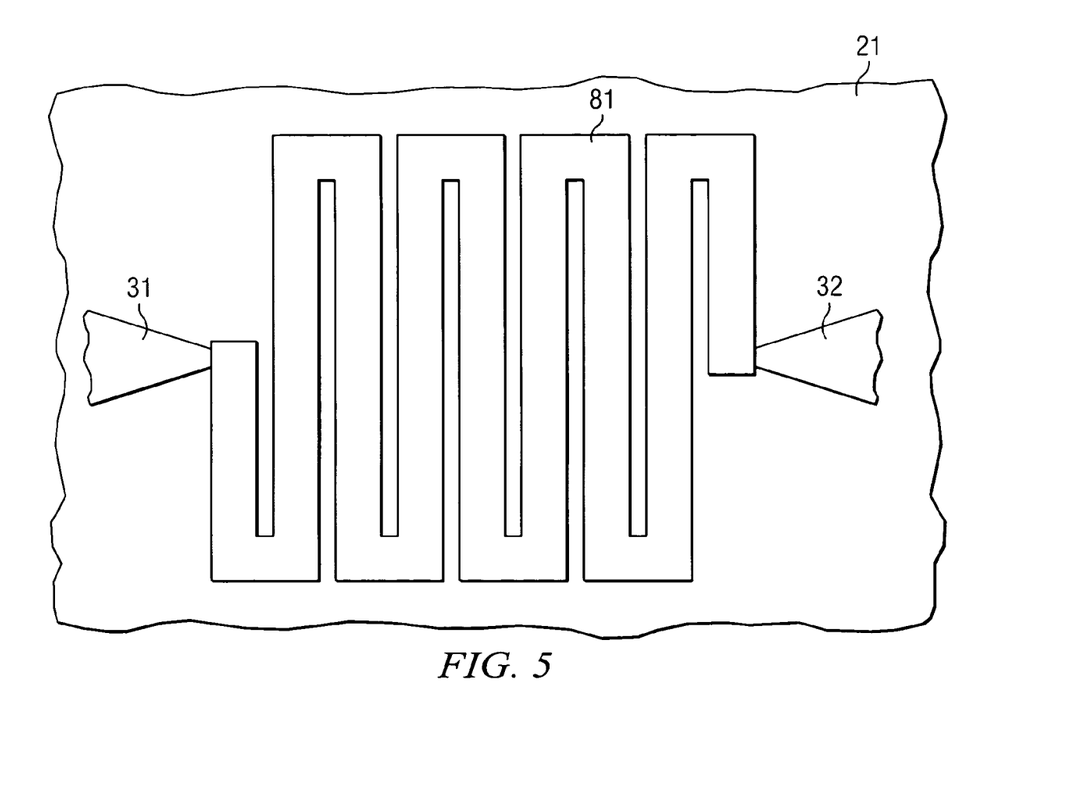
FIG. 5 is a diagrammatic fragmentary top view of part of an alternative embodiment of the detector section of FIG. 3.

In this regard, FIG. 5 is a diagrammatic top view of an alternative embodiment with a resistor 81 that is an alternative embodiment of the resistor 36. The resistor 81 is a thin layer of metal disposed on the top surface of the substrate 21, and is configured as an elongate strip that extends from the apex of one antenna element 31 to the apex of the other antenna element 32. The resistor 81 has a serpentine configuration with relatively small spaces between adjacent segments, so that a very high percentage of the space between the apexes of the antenna elements 31 and 32 is occupied by the resistor 81. This permits the resistor 81 to provide a reflectance characteristic which is comparable to that of the resistor 36 of FIG. 3. The width, thickness and length of the resistor 81 can all be selectively varied in order to obtain a specific desired resistance characteristic, while still providing an appropriate degree of reflectivity.

Figure 6:
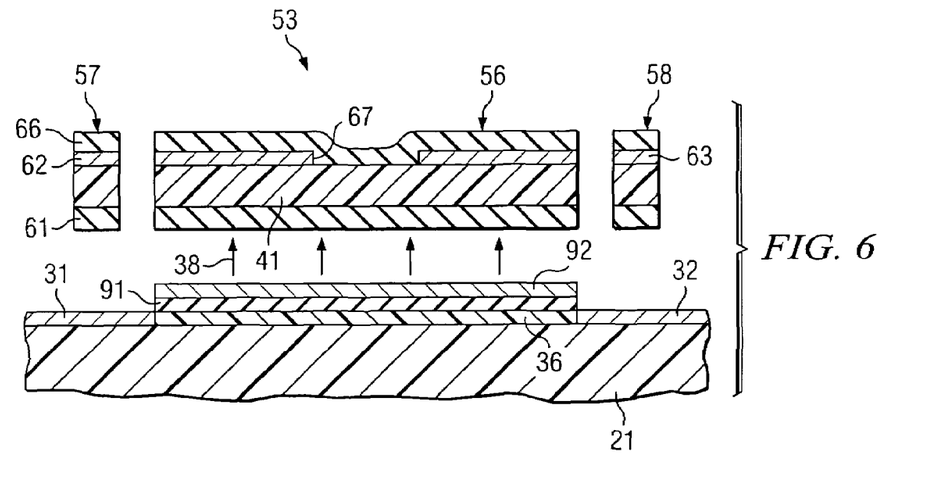
FIGS. 6–9 are each a diagrammatic fragmentary sectional view similar to FIG. 4, but showing a respective different alternative embodiment.

As discussed above, the resistor 36 of FIG. 3 and the resistor 81 of FIG. 5 are each capable of serving as a reflector with respect to infrared radiation. As an alternative, it is possible to provide a reflector which is physically separate from the resistor. In this regard, FIG. 6 is a diagrammatic fragmentary sectional view which is similar to FIG. 4, but which shows an alternative embodiment. The embodiment of FIG. 6 is identical to the embodiment of FIG. 4, except for the provision of some additional structure. In particular, a layer 91 is provided on top of the resistor 36, and is made of a material which is electrically insulating and thermally conductive. In FIG. 6, the layer 91 is made of silicon nitride, but it would alternatively be possible to use any other suitable material. A reflector layer 92 is provided on top of the layer 91. In FIG. 6, the reflector layer 92 is made of aluminum, but it could alternatively be made of any other suitable material.

In FIG. 6, the resistor 36 generates and emits infrared energy in the same manner as in the embodiment of FIG. 4. This infrared energy passes through the thermally conductive layer 91 to the reflective layer 92, and the reflective layer 92 emits the infrared energy upwardly through the resonant cavity, as indicated diagrammatically by the arrows 38. The layer 92 also serves as a reflector for infrared energy which is within the cavity between the layer 92 and the membrane 53, in order to optimize the absorption efficiency of the membrane 53. It will be recognized that the layers 91 and 92 can also be used with a resistor configuration other than that of the resistor 36, one example of which is the resistor 81 shown in FIG. 5.

Figure 7:
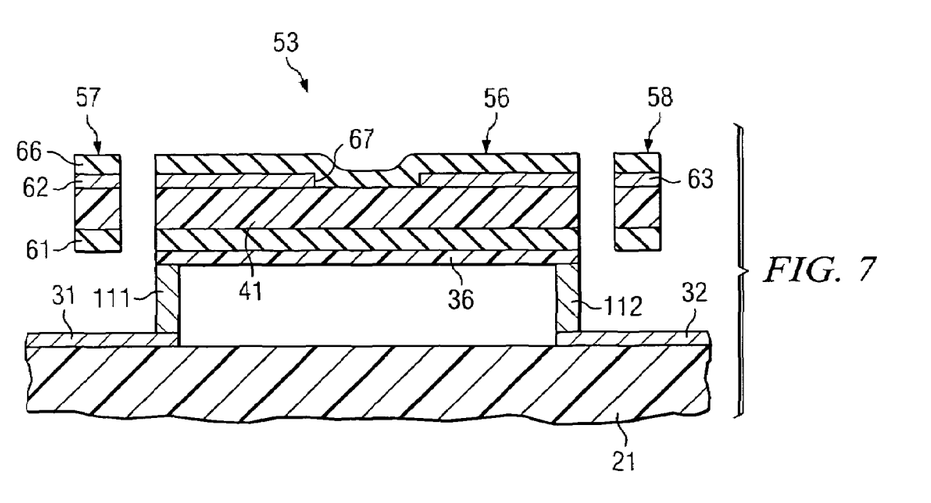

FIG. 7 is a diagrammatic fragmentary sectional view which is similar to FIGS. 4 and 6, but which shows yet another alternative embodiment. In this regard, FIG. 7 is similar to the embodiment of FIG. 4, except for the differences which are discussed below. In particular, the antenna elements 31 and 32 are still provided on the top surface of the substrate 21, but the layer which serves as the resistor 36 is not on the top surface of the substrate 21. Instead, the resistor 36 is disposed on the underside of the center portion 56 of the membrane 53. Opposite side edges of the resistor 36 are each electrically coupled to the apex of a respective antenna element 31 or 32 by a respective vertical post or via 111–112. In FIG. 7, the posts 111 and 112 are separate from and in addition to the posts shown at 51 and 52 in FIG. 3, and are spaced from each other and from the posts 51–52. In FIG. 7, the resistor 36 produces infrared energy in the same manner as in the embodiment of FIG. 4, but this infrared energy is transmitted by direct conduction through the layer 61 to the bolometer layer 41. Consequently, heat is transferred from the resistor 36 to the bolometer layer 41 with a very high degree of efficiency.

Figure 8:
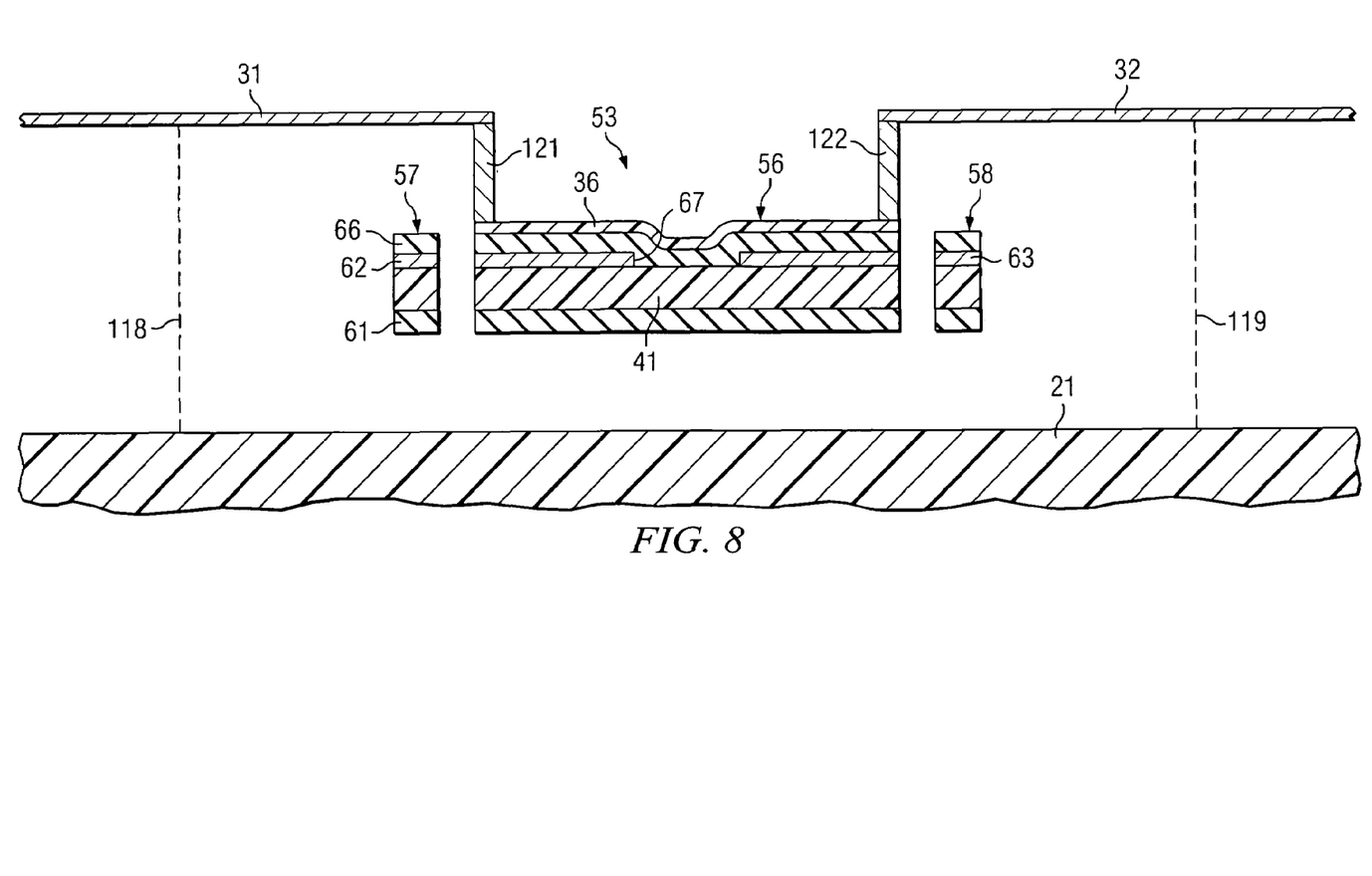

FIG. 8 is a diagrammatic fragmentary sectional view which is similar to FIG. 4, but which shows still another alternative embodiment. The embodiment of FIG. 8 is similar to the embodiment of FIG. 4, except for differences which are discussed below. In FIG. 8, it will be noted that the layer serving as the resistor 36 is provided on top of the center portion 56 of the membrane 53, and in particular is on top of the layer 66. The antenna elements 31 and 32 are not provided on the top surface of the substrate 21, but instead are supported at location which is vertically higher than the resistor 36.

The structure which physically supports the antenna elements 31 and 32 is indicated diagrammatically in FIG. 8 by broken lines 118 and 119. Persons skilled in the art will readily understand the type of structure which would be needed to support the antenna elements 31 and 32. Two conductive posts or vias 121 and 122 each extend vertically from a respective opposite side of the resistor 36 to an apex of a respective antenna element 31 or 32. The vias 121 and 122 provide a path for electrical energy, but do not support the weight of the antenna elements 31–32. Instead, the weight of the antenna elements 31–32 is supported by the support structure 118–119. It should be noted that, in FIG. 8, the antenna elements 31 and 32 are spaced from the substrate and the readout circuitry in the substrate, thereby reducing the extent to which the antenna elements 31 and 32 may possibly be influenced by electromagnetic radiation generated by the operation of the readout circuit 42. The vias 121–122 are each configured to be relatively small in cross section, in order to provide a degree of thermal isolation between the resistor 36 and the antenna elements 31–32, so as to minimize the extent to which heat generated within the resistor can flow into either antenna element.

Figure 9:
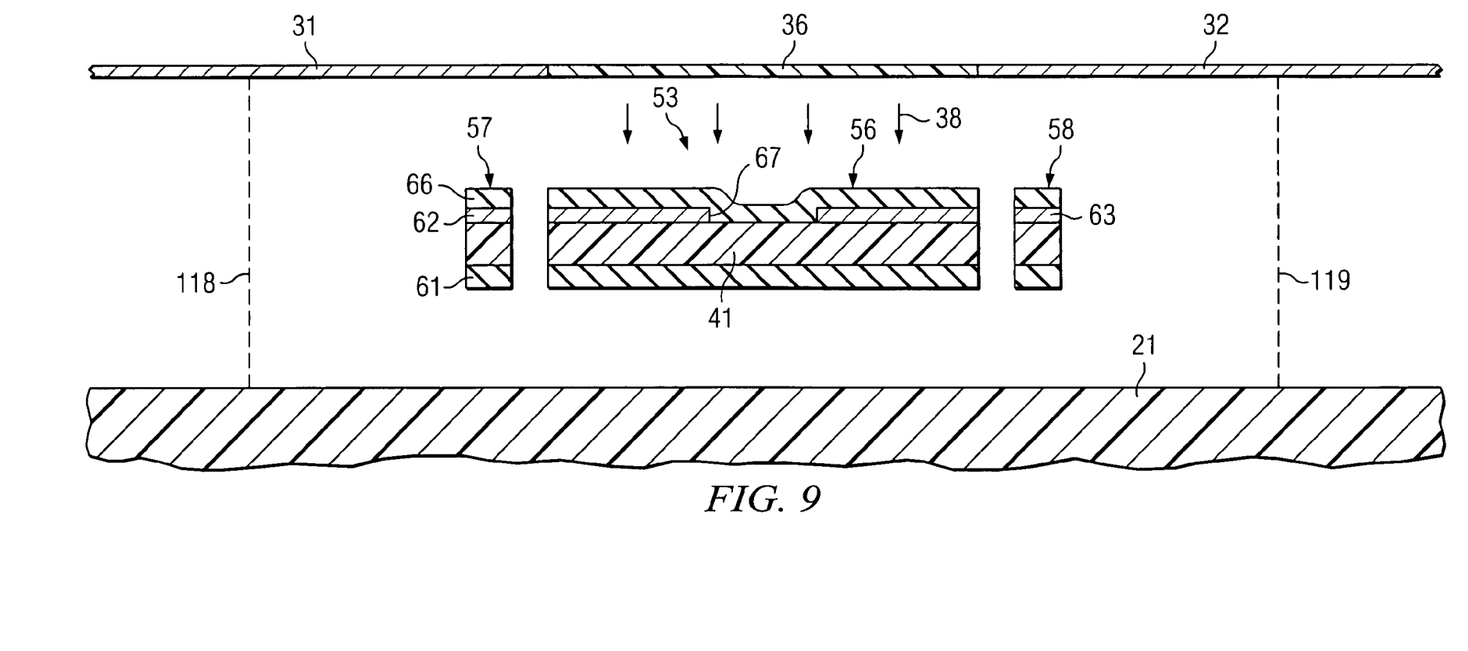

FIG. 9 is a diagrammatic fragmentary sectional view which is similar to FIG. 4, but which shows yet another alternative embodiment. The embodiment of FIG. 9 is similar to the embodiment of FIG. 4, except for differences which are discussed below. In the embodiment of FIG. 9, the antenna elements 31–32 and the resistor 36 are all provided at a location spaced vertically above the membrane 53, in a manner so that they are all on effectively the same vertical level. Structure supporting the antenna elements 31–32 and the resistor 36 at this level is indicated diagrammatically in FIG. 9 by broken lines 118 and 119. The infrared radiation 38 emitted by the resistor 36 travels downwardly to the membrane 53. Since the resistor 36 has a degree of reflectivity, a resonant cavity is formed above the membrane 53, between the membrane 53 and the resistor 36.

Figure 10:
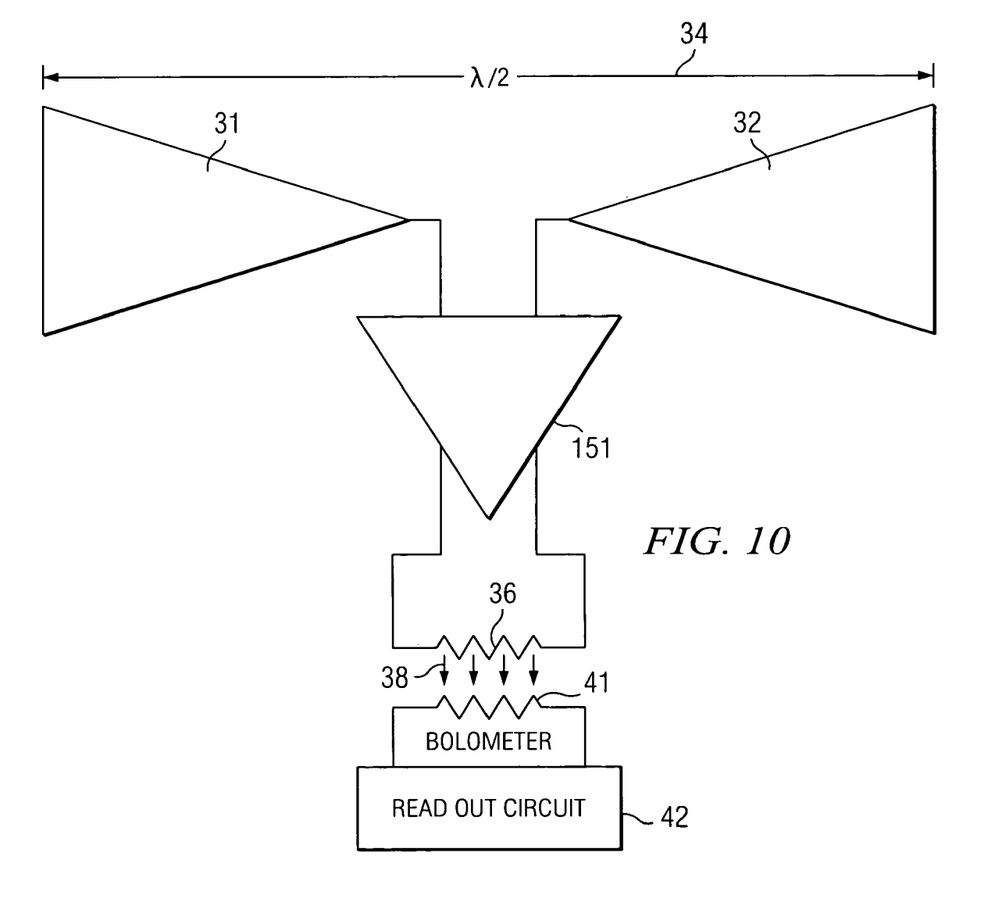
FIG. 10 is a block diagram showing a detector section which is an alternative embodiment of the detector section of FIG. 2.

FIG. 10 is a block diagram showing a detector section which is an alternative embodiment of the detector section of FIG. 2. The detector section of FIG. 10 is identical to the detector section of FIG. 2, except that an amplifier 151 of a known type has been inserted between the antenna elements 31–32 and the resistor 36. In particular, the amplifier 151 has two input terminals, each of which is electrically coupled to the inner apex of a respective one of the two antenna elements 31 and 32. Further, the amplifier 151 has two output terminals, each of which is coupled to a respective end of the resistor 36. The amplifier 151 can be selected so that the input impedance of the amplifier is matched to the impedance of the antenna, and so that the output impedance of the amplifier is matched to the resistance of the absorber. Where impedances are appropriately matched in this manner, the overall efficiency of the detector section is optimized. Further, use of the amplifier 151 avoids the need to try to directly match the impedance of the antenna elements as closely as possible to the impedance of the absorber.

The present invention provides a number of advantages. One such advantage results from the provision of a surrogate absorber in the form of a resistor having a resistance which is matched to the low-impedance antenna elements, so that the bolometer resistance can be optimized for best sensitivity without regard to the antenna elements. In effect, the invention permits separate control over the functions of maximizing heat generation based on detected energy, and optimizing sensitivity of the infrared detector. A further advantage is that an accurate and sensitive detector of a known type, which operates in one frequency range such as that of infrared energy, can be used to detect and/or image radiation from a significantly different frequency range. This is particularly advantageous in a context involving the detection or imaging of radiation which has frequencies well below the frequencies of infrared energy.

Although several selected embodiments have been illustrated and described in detail, it will be understood that various substitutions and alterations are possible without departing from the spirit and scope of the present invention, as defined by the following claims.

What is claimed is:

1. An apparatus comprising an integrated circuit having a section which includes:
    a resonator portion responsive to electromagnetic radiation within a first frequency range;
    a converter portion coupled to said resonator portion, and responsive to radiation received by said resonator portion within said first frequency range for emitting electromagnetic radiation within a second frequency range substantially different from said first frequency range;
    a detector portion responsive to radiation within said second frequency range and disposed in the region of said converter portion, said detector portion detecting radiation emitted by said converter portion within said second frequency range;
    wherein said second frequency range includes infrared radiation, and said radiation emitted by said converter portion is infrared radiation; and
    wherein said converter portion includes a resistive element which is impedance matched with said resonator portion, and which emits said infrared radiation.

2. An apparatus according to claim 1, wherein said first frequency range includes radiation which is substantially lower in frequency than infrared radiation.

3. An apparatus according to claim 1, wherein said resonator portion includes spaced first and second antenna elements, and including an amplifier having two inputs and two outputs, said inputs of said amplifier each being coupled to a respective one of said antenna elements, and said outputs of said amplifier each being coupled to a respective end of said resistive element.

4. An apparatus according to claim 1, wherein said resonator portion includes spaced first and second antenna elements, said resistive element having two ends which are each coupled to a respective one of said antenna elements.

5. An apparatus according to claim 4, wherein said antenna elements are each approximately triangular, and collectively form a bow-tie antenna.

6. An apparatus according to claim 1, wherein said integrated circuit has a further section which includes:
    a further resonator portion responsive to electromagnetic radiation;
    a further converter portion coupled to said further resonator portion, and responsive to radiation received by said further resonator portion for emitting electromagnetic radiation within said second frequency range; and a further detector portion responsive to radiation within said second frequency range and disposed in the region of said further converter portion, said further detector portion detecting radiation emitted by said further converter portion within said second frequency range.

7. An apparatus according to claim 6, wherein said further resonator portion is responsive to electromagnetic radiation in said first frequency range.

8. An apparatus comprising an integrated circuit having a section which includes:
   a resonator portion responsive to electromagnetic radiation within a first frequency range;
   a converter portion coupled to said resonator portion, and responsive to radiation received by said resonator portion within said first frequency range for emitting electromagnetic radiation within a second frequency range substantially different from said first frequency range; and
   a detector portion responsive to radiation within said second frequency range and disposed in the region of said converter portion, said detector portion detecting radiation emitted by said converter portion within said second frequency range;
   wherein said integrated circuit includes a substrate, and structure suspending said detector portion at a location spaced above said substrate;
   wherein said converter portion includes a resistive element which is substantially aligned with said detector portion in horizontal directions, and which has two ends; and
   wherein said resonator portion includes spaced first and second antenna elements which are each coupled to a respective end of said resistive element.

9. An apparatus according to claim 8, wherein said resistive element is spaced vertically from said detector portion, and is made of a material which is reflective to radiation in said second frequency range, the space between said detector portion and said resistive element facilitating absorption by said detector portion of radiation in said second frequency range.

10. An apparatus according to claim 9, wherein said resistive element has a serpentine configuration.

11. An apparatus according to claim 8, wherein said resistive element and said first and second antenna elements are all supported by said substrate at a location spaced vertically lower than said detector portion.

12. An apparatus according to claim 8, wherein said resistive element is disposed closely adjacent said detector portion, and said first and second antenna elements are both supported by said substrate at a location spaced vertically from said resistive element.

13. An apparatus according to claim 12, wherein said fist and second antenna elements are vertically lower than said resistive element.

14. An apparatus according to claim 12, wherein said first and second antenna elements are vertically higher than said resistive element.

15. An apparatus according to claim 8, wherein said resistive element and said first and second antenna elements are all supported by said substrate at a location spaced vertically higher than said detector portion.

16. An apparatus comprising an integrated circuit having a section which includes:
   a resonator portion responsive to electromagnetic radiation within a first frequency range;
   a converter portion coupled to said resonator portion, and responsive to radiation received by said resonator portion within said first frequency range for emitting electromagnetic radiation within a second frequency range substantially different from said first frequency range;
   a detector portion responsive to radiation within said second frequency range and disposed in the region of said converter portion, said detector portion detecting radiation emitted by said converter portion within said second frequency range;
   wherein said integrated circuit has a further section which includes:
      a further resonator portion responsive to electromagnetic radiation;
      a further converter portion coupled to said further resonator portion, and responsive to radiation received by said further resonator portion for emitting electromagnetic radiation within said second frequency range;
      a further detector portion responsive to radiation within said second frequency range and disposed in the region of said further converter portion, said further detector portion detecting radiation emitted by said further converter portion within said second frequency range; and
   wherein said further resonator portion is responsive to electromagnetic radiation in a frequency range different from said first and second frequency ranges.

17. An apparatus comprising an integrated circuit having a section which includes:
   a resonator portion responsive to electromagnetic radiation within a first frequency range;
   a converter portion coupled to said resonator portion, and responsive to radiation received by said resonator portion within said first frequency range for emitting electromagnetic radiation within a second frequency range substantially different from said first frequency range;
   a detector portion responsive to radiation within said second frequency range and disposed in the region of said converter portion, said detector portion detecting radiation emitted by said converter portion within said second frequency range;
   wherein said integrated circuit has a further section which includes:
      a further resonator portion responsive to electromagnetic radiation;
      a further converter portion coupled to said further resonator portion, and
      responsive to radiation received by said further resonator portion for emitting electromagnetic radiation within said second frequency range;
      a further detector portion responsive to radiation within said second frequency range and disposed in the region of said further converter portion, said further detector portion detecting radiation emitted by said further converter portion within said second frequency range; and
   wherein said resonator portions have respective different orientations.

18. An apparatus comprising:
   a resonator portion responsive to electromagnetic radiation within a selected frequency range which is substantially different from a frequency range of infrared radiation;
   a converter portion coupled to said resonator portion, and responsive to radiation received by said resonator portion within said selected frequency range for emitting infrared radiation;

a detector portion responsive to infrared radiation and which is disposed in the region of said converter portion, said detector portion detecting infrared radiation emitted by said converter portion; and wherein said converter portion includes a resistive element which is impedance matched with said resonator portion and which emits said infrared radiation.

19. An apparatus according to claim 18, wherein said resonator portion includes spaced first and second antenna elements, and including an amplifier having two inputs and two outputs, said inputs of said amplifier each being coupled to a respective one of said antenna elements, and said outputs of said amplifier each being coupled to a respective end of said resistive element.

20. An apparatus according to claim 18, wherein said resonator portion includes spaced first and second antenna elements, said resistive element having two ends which are each coupled to a respective one of said antenna elements.

21. An apparatus according to claim 20, wherein said antenna elements are each approximately triangular, and collectively form a bow-tie antenna.

22. An apparatus according to claim 18, including:
a further resonator portion responsive to electromagnetic radiation;
a further converter portion coupled to said further resonator portion, and responsive to radiation received by said further resonator portion for emitting infrared radiation; and
a further detector portion responsive to infrared radiation and disposed in the region of said further converter portion, said further detector portion detecting infrared radiation emitted by said further converter portion.

23. An apparatus according to claim 22, wherein said further resonator portion is responsive to electromagnetic radiation in said selected frequency range.

24. An apparatus comprising:
a resonator portion responsive to electromagnetic radiation within a selected frequency range which is substantially different from a frequency range of infrared radiation;
a converter portion coupled to said resonator portion, and responsive to radiation received by said resonator portion within said selected frequency range for emitting infrared radiation;
a detector portion responsive to infrared radiation and which is disposed in the region of said converter portion, said detector portion detecting infrared radiation emitted by said converter portion;
a further resonator portion responsive to electromagnetic radiation;
a further converter portion coupled to said further resonator portion, and responsive to radiation received by said further resonator portion for emitting infrared radiation;
a further detector portion responsive to infrared radiation and disposed in the region of said further converter portion, said further detector portion detecting infrared radiation emitted by said further converter portion; and
wherein said further resonator portion is responsive to electromagnetic radiation in a frequency range different from said selected frequency range and different from a frequency range of infrared radiation.

25. An apparatus comprising:
a resonator portion responsive to electromagnetic radiation within a selected frequency range which is substantially different from a frequency range of infrared radiation;
a converter portion coupled to said resonator portion, and responsive to radiation received by said resonator portion within said selected frequency range for emitting infrared radiation;
a detector portion responsive to infrared radiation and which is disposed in the region of said converter portion, said detector portion detecting infrared radiation emitted by said converter portion;
a further resonator portion responsive to electromagnetic radiation;
a further converter portion coupled to said further resonator portion, and responsive to radiation received by said further resonator portion for emitting infrared radiation;
a further detector portion responsive to infrared radiation and disposed in the region of said further converter portion, said further detector portion detecting infrared radiation emitted by said further converter portion; and
wherein said resonator portions have respective different orientations.

26. A method of operating an apparatus having an integrated circuit with a section which includes a resonator portion, a converter portion coupled to said resonator portion, and a detector portion disposed in the region of said converter portion, comprising:
causing said converter portion to respond to radiation received by said resonator portion within a first frequency range by emitting electromagnetic radiation within a second frequency range substantially different from said first frequency range;
detecting with said detector portion the radiation emitted by said converter portion within said second frequency range;
selecting said second frequency range to include infrared radiation;
causing said radiation emitted by said converter portion to be infrared radiation;
selecting said first frequency range to include radiation which is substantially lower in frequency than infrared radiation; and
configuring said converter portion to include a resistive element which is impedance matched with said resonator portion, and which emits said infrared radiation.

27. A method according to claim 26, including configuring said resonator portion to include spaced first and second antenna elements, said resistive element having two ends which are each coupled to a respective one of said antenna elements.

28. A method of operating an apparatus having a resonator portion, a converter portion coupled to said resonator portion, and a detector portion disposed in the region of said converter portion, comprising:
causing said converter portion to respond to radiation received by said resonator portion within a selected frequency range by emitting infrared radiation, said selected frequency range being substantially different from a frequency range of infrared radiation;
detecting with said detector portion the infrared radiation emitted by said converter portion; and
including configuring said converter portion to include a resistive element which is impedance matched with said resonator portion and which emits said infrared radiation.

29. A method according to claim 28, including configuring said resonator portion to include spaced first and second antenna elements, said resistive element having two ends which are each coupled to a respective one of said antenna elements.

* * * * *